United States Patent [19]

Kindig

[11] Patent Number: 5,368,617
[45] Date of Patent: Nov. 29, 1994

[54] PROCESS FOR REDUCING SULFUR EMISSIONS WITH CALCIUM-CONTAINING SORBENTS

[75] Inventor: James K. Kindig, Boulder, Colo.

[73] Assignee: Genesis Research Corp., Carefree, Ariz.

[21] Appl. No.: 876,496

[22] Filed: Apr. 30, 1992

Related U.S. Application Data

[63] Continuation-in-part of Ser. No. 775,860, Oct. 15, 1991, which is a continuation-in-part of Ser. No. 492,312, Mar. 6, 1990, Pat. No. 5,096,066, which is a continuation of Ser. No. 126,419, Nov. 30, 1987, abandoned.

[51] Int. Cl.$^5$ .................. C10L 9/00; C10L 10/00; C10L 5/00
[52] U.S. Cl. ........................ 44/622; 44/580; 44/604; 110/342; 110/343; 110/345; 423/235; 423/242; 423/244 A; 423/244 R; 423/242.1; 423/244.07; 423/244.08
[58] Field of Search .............. 423/235, 244 R, 244 A, 423/242; 44/604, 620, 622, 580; 431/3; 110/342, 343, 345

[56] References Cited

U.S. PATENT DOCUMENTS

| | | |
|---|---|---|
| 4,262,610 | 4/1981 | Hein et al. . |
| 4,279,873 | 7/1981 | Felsvang et al. . |
| 4,470,921 | 9/1984 | Lin . |
| 4,496,365 | 1/1985 | Lindemann ............... 44/580 |
| 4,501,618 | 2/1985 | Gebhard et al. . |
| 4,519,995 | 5/1985 | Schrofelbauer et al. . |
| 4,642,225 | 2/1987 | Leikert ................. 423/244 |
| 4,788,047 | 11/1988 | Hamala et al. . |
| 4,804,521 | 2/1989 | Rochelle et al. . |
| 4,824,441 | 4/1989 | Kindig . |
| 4,861,568 | 8/1989 | Robinson, Jr. ........... 423/243 |
| 4,867,955 | 9/1989 | Johnson . |
| 4,886,519 | 12/1989 | Hayes et al. . |
| 4,917,024 | 4/1990 | Marten et al. . |
| 4,921,886 | 5/1990 | Ewan et al. . |
| 4,922,840 | 5/1990 | Woodruffee ............... 410/345 |
| 4,931,264 | 6/1990 | Rochelle et al. . |
| 4,956,162 | 9/1990 | Smith et al. . |
| 4,980,138 | 12/1990 | Samish . |
| 5,002,743 | 3/1991 | Kokkonen et al. . |
| 5,017,349 | 5/1991 | Davis et al. . |
| 5,027,723 | 7/1991 | Landreth et al. . |
| 5,034,205 | 7/1991 | Laine . |
| 5,047,221 | 9/1991 | Jozewicz et al. . |
| 5,047,222 | 9/1991 | Rochelle et al. . |

OTHER PUBLICATIONS

Babcock & Wilcox, *The Coal and Slurry Technology Associations 1992 Industry Handbook.*
Hall et al., *Current Status of ADVACATE Process for Flue Gas Desulfurization* for Presentation at AWMA 1991 Annual Meeting, Vancouver, B.C., Jun. 1991.

Primary Examiner—Margaret Medley
Attorney, Agent, or Firm—Sheridan Ross & McIntosh

[57] ABSTRACT

An improved process for reducing sulfur oxide emissions from the combustion of coal is disclosed wherein a fuel mixture comprising calcium-containing sorbent and coal is fed to the burners and sulfur oxides react with calcium from the sorbent in a high temperature sulfur capture region, followed by additional sulfur capture in a lower temperature, high humidity sulfur capture region prior to separation of particulates from the flue gas. Sulfur capture using calcium-containing sorbents can be combined with aggressive coal beneficiation techniques to further enhance reduction of sulfur oxide emissions. The process of the invention provides a process for reducing sulfur oxides that efficiently uses calcium-containing sorbents to enhance sulfur capture while reducing the need for expensive equipment or process modifications.

19 Claims, 3 Drawing Sheets

PROCESS FOR REDUCING SULFUR EMISSIONS WITH CALCIUM-CONTAINING SORBENTS

REFERENCES TO RELATED APPLICATIONS

This application is a continuation-in-part of U.S. application Ser. No. 07/775,860 filed on Oct. 15, 1991, which is a continuation-in-part of U.S. application Ser. No. 07/492,312, now U.S. Pat. No. 5,096,066, filed on Mar. 6, 1990, which is a continuation of U.S. application Ser. No. 07/126,419 filed on Nov. 30, 1987, now abandoned.

FIELD OF THE INVENTION

The present invention relates to an improved process for reducing sulfur oxide emissions from combustion of coal using calcium-containing sorbent.

BACKGROUND OF INVENTION

During the combustion of coal, and in particular combustion of many lower grades of coal, sulfur oxides are produced which, if emitted into the atmosphere can cause significant environmental pollution. Several methods for reducing the amount of sulfur oxide emissions that are released into the atmosphere have been developed.

One method is to burn low sulfur coal in an attempt to avoid problems associated with excessive sulfur oxide emissions. However, such fuel is not always readily available and the cost to transport such high quality coal is in many cases prohibitive. Significant deposits of high sulfur coal exist in the United States, predominantly in the Eastern part of the nation. Therefore, significant research has been conducted and several processes developed for reducing emissions from such high sulfur coals.

It is known that, under certain conditions, calcium reacts with sulfur oxides in flue gas from the combustion of sulfur-containing coal to capture sulfur as calcium sulfite and/or calcium sulfate, thereby reducing the release of sulfur oxide emissions.

It is also known that, calcium-containing sorbents can be added directly to the combustion chamber to react with sulfur oxides in the high temperature region following combustion. U.S. Pat. No. 4,824,441 by Kindig, issued Apr. 25, 1989 discuss several methods that have been tried to improve the sulfur capturing capability of calcium-containing sorbents in the high temperature region following combustion. For example, various promoters and catalysts can effect the efficiency of sulfur capture. Also, mixing the sorbent material with the coal prior to combustion increases the residence time of calcium with sulfur oxides in the high temperature region in which calcium is reactive with sulfur oxides.

It is also known that calcium will react with sulfur oxides in a lower temperature environment, wherein the temperature is close to the temperature at which water, and generally sulfuric acid produced by water and sulfur oxides, condense from the flue gas stream. Such condensation temperature is also sometimes referred to as the saturation temperature or the adiabatic saturation temperature.

U.S. Pat. No. 4,867,955 by Johnson, issued Sep. 19, 1989, discusses the injection of calcium-containing sorbent and water into the flue gas to promote reaction of calcium with sulfur oxides to effect capture of sulfur in a lower temperature, humidified environment. U.S. Pat. No. 4,867,955 also discusses injection of calcium carbonate into the combustion chamber to effect calcination of the calcium carbonate to calcium oxide. Such calcined sorbent is thereafter reacted in a lower temperature, high humidity environment to effect sulfur capture.

Some attempts have been made to combine sulfur capture in the high temperature combustion region with sulfur capture in a subsequent lower temperature, high humidity environment. U.S. Pat. No. 4,519,995 by Schrofelbauer et al., issued May 28, 1985 discusses a process wherein lignite and calcium carbonate are pulverized and fed together to coal dust burners. Some flue gas is recycled to the combustion zone to reduce the temperature in that region. Prior to entry of flue gas into the dust filter, the relative moisture of the flue gas is increased by cooling the hot flue gas in a heat exchanger and/or by injecting or spraying water into the hot flue gas such that additional sulfur is captured in a lower temperature, humidified environment by sorbent that has collected on the bag filter surface. U.S. Pat. No. 5,002,743 by Kokkonen et al., issued Mar. 26, 1991, discusses the addition of sorbent to the combustion zone, independent of the fuel, followed by humidification to effect reaction at a lower temperature.

As these references indicate, there is a need to efficiently reduce environmental pollution by sulfur oxide emissions following combustion of coal. More efficient and less costly sulfur removal techniques are required to effectively use existing high sulfur coal resources.

The process of the present invention involves capturing sulfur in a high temperature region following combustion of coal and also in a lower temperature, high humidity environment under conditions such that the efficiency of sulfur capture is enhanced and the need for expensive modifications of existing processes and equipment is reduced.

SUMMARY OF THE INVENTION

Figure 1:
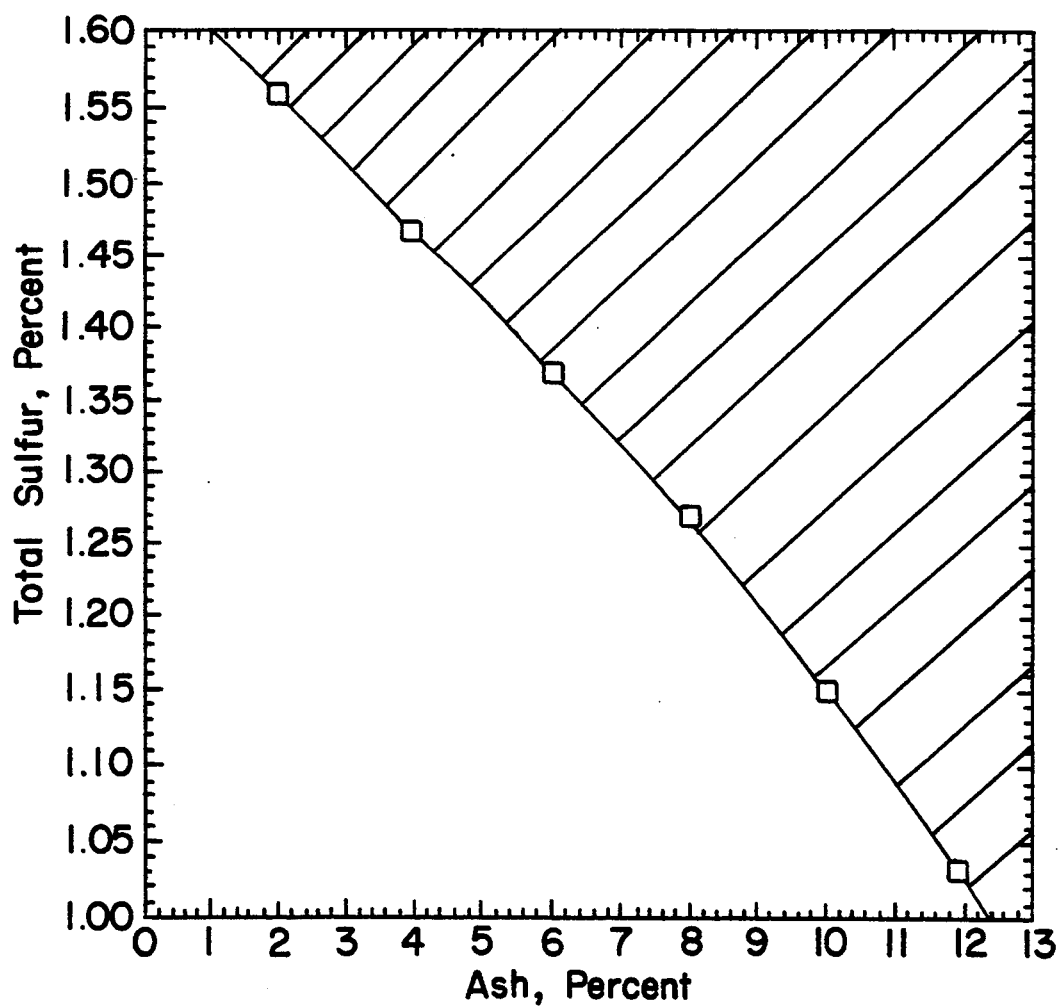
FIG. 1 is a graph showing one example of the effective limit of sulfur capture in a high temperature sulfur capture region as a function of ash-forming material in the coal.

The present invention involves a process for reducing sulfur oxide emissions from coal fired facilities using calcium-containing sorbents to capture sulfur in both a high temperature stage in the vicinity of the combustion chamber and in a lower temperature, high humidity stage downstream of the combustion chamber and upstream of particulate separation equipment. Sorbent and coal are mixed and fed together as a fuel mixture to the burners where the coal combusts. In one embodiment, the fuel mixture containing sorbent and coal is pelletized. In another embodiment, the coal particles in the pellets comprise very fine particle coal.

In one embodiment of the invention, beneficiated coal, and preferably aggressively beneficiated coal, is used in the sulfur oxide reducing process. Beneficiation of coal is followed by mixture with calcium-containing sorbents. In another embodiment, high sulfur coal or coal from which pyrite is difficult to liberate is the raw coal for the beneficiation process.

In another embodiment, flue gases, containing entrained ash and unreacted sorbent, are humidified downstream of the air preheater, but close enough to the air preheater to allow sufficient residence time for the lower temperature, high humidity sulfur capture, prior to entry of the flue gas into particulate separation equipment.

In another embodiment of the invention, unreacted sorbent can be separated from the flue gas at various points and recycled for injection back into the flue gas stream at or upstream of the point of humidification for the low temperature sulfur capture region.

DETAILED DESCRIPTION OF THE INVENTION

The present invention involves a process for reducing the release of sulfur oxide emissions produced during the combustion of coal. A fuel mixture containing coal calcium-containing sorbent particles is fed to coal burners. A portion of sulfur oxides in the combustion flue gases react with calcium provided by the sorbent to capture sulfur in a high temperature region following combustion. Calcium that has not reacted to capture sulfur in the high temperature region exits the high temperature region with combustion flue gases. At a temperature close to, but above, the condensation temperature of water in the flue gas, some of this unreacted calcium is then reacted with sulfur oxides remaining in the flue gas to capture additional sulfur in a lower temperature region before the flue gases enter particulate separation equipment.

Suitable sorbents include any calcium-containing compound such as limestone ($CaCO_3$), lime (CaO) or dolomite ($CaCO_3.MgCO_3$), and a more preferable sorbent is limestone. If limestone is added to the fuel mixture, such limestone is typically calcined to produce lime in the high temperature region of the combustion zone. Dolomite will likewise undergo calcination in the high temperature region. The fuel mixture may contain promoters and/or catalyst, however such additives are not required. For example, some suitable sorbents and fuel mixtures are discussed in U.S. Pat. No. 4,824,441 by Kindig, issued Apr. 25, 1989, the contents of which are incorporated herein as if set forth in full.

In a preferred embodiment of the present invention, the fuel mixture comprises a beneficiated coal, preferably an aggressively beneficiated coal. As used herein, coal refers to all ranks of anthracite, bituminous, sub-bituminous and lignitic materials. As used herein, beneficiated coal refers to the product from cleaning raw coal, also called run-of-mine coal, of some ash-forming material, and preferably some ash-forming material containing sulfur, prior to use of the coal as a combustion fuel. Aggressively beneficiated coal, as used herein, refers to a product derived from a coal cleaning process designed for efficient beneficiation of fine particles, preferably particles smaller than about 0.5 mm. Aggressively beneficiated coal includes a product derived from a coal cleaning procedure comprising (1) recovering coarse clean coal, (2) rejecting a coarse refuse, (3) comminuting the resulting middlings to fines if required to assist liberation of pyrite (typically minus 0.5 mm) and (4) efficiently beneficiating comminuted fines and fines resulting from mining. Preferably, such aggressive beneficiation is as discussed in copending application Ser. No. 07/775,860 filed Oct. 15, 1992, entitled "Coal Cleaning Process," the contents of which are incorporated herein as if set forth in full. The purpose of beneficiating coal, or aggressively beneficiating coal, is to remove pyritic sulfur, also sometimes referred to as inorganic sulfur, from the raw coal and thereby reducing sulfur to produce a clean coal product that contains less sulfur and less ash-forming materials than the raw coal, thereby reducing sulfur oxide emissions and ash production during combustion.

Excessive ash formation during combustion creates significant problems in the operation of coal fired facilities, such as electrical power generation facilities. Complications caused by ash formation are increased by the use of sorbent materials, whether mixed with the coal in a fuel mixture or added separately to the combustion chamber, because such sorbent materials form ash on combustion. As used herein, ash refers to the combustion products of the myriad inorganic minerals and constituents, regardless of origin, associated with coal, including for example, the following groups: shales, kaolin, sulfide, carbonate, chloride, oxide and accessory minerals. Although the acceptable amount of ash varies, the fuel mixture containing coal and sorbent should generally contain less than about 20% of total ash-forming materials, including ash-forming materials from the coal and the sorbent, preferably less than 15% ash-forming materials, and more preferably less than about 12% ash-forming materials.

The amount of sorbent that can be added to the combustion chamber is effectively limited by the acceptable level of ash formation during combustion, which acceptable level varies depending on the specific facility design. Because beneficiated coal, and particularly aggressively beneficated coal, contains a reduced level of ash-forming materials relative to raw coal, a higher level of sorbent can be added to beneficiated coal than raw coal, and an even higher level of sorbent can be added to aggressively beneficiated coal.

The process of the present invention is particularly useful when insufficient sorbent can be mixed with coal in the fuel mixture to effect the desired sulfur oxide emissions reduction in the high temperature capture zone alone, without exceeding ash-forming limitations. A relationship exists between the amount of sulfur that can effectively be captured in the high temperature capture zone and the level of ash in the coal from which a fuel mixture of coal and sorbent is made. For example, FIG. 1 shows the amount of sulfur allowable in coal with a given ash content, assuming that ash-forming material in the fuel mixture is limited to 15% by weight, that no more than 1.2 pounds of sulfur dioxide per million BTU of coal is released into the atmosphere, and that sulfur is captured only in a high temperature capture zone. The shaded zone indicates conditions under which the process of the present invention would be particularly useful since additional sulfur can be captured in a lower temperature, high humidity region. As used herein, pounds of sulfur dioxide per million BTU refers to the theoretical amount of sulfur dioxide that would be produced if all sulfur in the coal formed sulfur dioxide upon combustion relative to the gross heating value of the coal.

In addition to reducing ash-forming materials, beneficiation of coal, and particularly aggressive beneficiation, also reduces the amount of pyritic sulfur in coal, thereby reducing the overall level of sulfur capture required by sorbents subsequently mixed with the coal. Pyritic sulfur, sometimes referred to as inorganic sulfur, as used herein, refers to sulfur which is not chemically bound in the coal matrix. Conversely, organic sulfur refers to that sulfur chemically bound in the coal matrix.

According to the process of the present invention, calcium-containing sorbents in the fuel mixture are reacted with sulfur oxides to capture sulfur following combustion of the fuel mixture in a high temperature region in the vicinity of the combustion zone. Such high temperature sulfur capture using calcium generally occurs at temperatures from about 2250° F. to about 1500° F. Such calcium reacts with sulfur oxides to form calcium sulfate, a solid which can be removed from the flue gases in downstream particulate separation equipment. Using a fuel mixture comprising intimately mixed coal and sorbent particles promotes efficient sulfur capture in the high temperature region by maximizing residence time in the high temperature zone, and by providing maximum contact between sulfur oxides and calcium in the sulfur sorbent. Additional discussion concerning high temperature sulfur capture is presented in U.S. Pat. No. 4,824,441, supra.

Not all sorbent material however, reacts with sulfur oxides to capture sulfur in the high temperature region. Calcium in the sorbent reacts more slowly with sulfur oxides at temperatures below about 1500° F. It is known however that calcium in calcium-containing sorbents reacts more quickly with sulfur oxides at reduced temperature and increased humidity.

In a typical coal fired electrical power generation facility, combustion flue gases exiting from the combustion zone are passed through an air preheater, wherein heat in the flue gas is transferred by heat exchange to incoming air to be used in the combustion reaction. Following heat exchange in the air preheater, the flue gases have generally been cooled to a temperature of from about 275° F. to about 375° F. Additional sulfur capture, using unreacted calcium, can be effected downstream of the air preheater by increasing the humidity of the flue gas stream such that the unreacted calcium becomes reactive with sulfur oxides, thereby capturing additional sulfur in the form of calcium sulfate or calcium sulfite.

In one embodiment of the present invention, following the air preheater, flue gases are humidified such that the temperature of the flue gases is within about 100° F. above the condensation temperature of such flue gas stream, preferably within about 50° F. above the condensation temperature, more preferably within about 30° F. above the condensation temperature, and most preferably within about 15° F. above the condensation temperature. As used herein, condensation temperature refers to that temperature at which water, and also aqueous sulfuric acid created reaction of water with sulfur oxides, condense from the flue gas. Such temperature is also referred to as the saturation temperature and as the adiabatic saturation temperature. Humidification can be accomplished either by heat exchange, whereby the flue gas stream is cooled to a desired temperature close to the condensation temperature, or by adding water, preferably in the form of a fine spray, to the flue gas stream, such that the added water is completely vaporized and the corresponding humidity of the flue gas stream increases to the desired level.

In a preferred embodiment, humidification occurs after the air preheater, but as close to the air preheater as possible so as to maximize the residence time for the lower temperature sulfur capture reaction. Electrical power generation facilities generally have particle separation equipment downstream of the air preheater to remove particles from the flue gas stream prior to releasing such flue gases to the environment. The flue gas process flow can be modified to incorporate a special reactor space to provide sufficient residence time for effective sulfur capture following humidification. Preferably however, humidification of the flue gas stream occurs sufficiently upstream of particulate separation such that no additional reactor space or special reactor design is required for such effective sulfur capture. Preferably, a residence time for sulfur capture in this low temperature zone between the point of humidification and the particle separation equipment is greater than about 0.1 second, more preferably greater than about 1 second, and most preferably greater than about 3 seconds.

Performing the humidification step as close to the air preheater as possible is particularly important when particulate separation is by means, such as electrostatic precipitation or cycloning, wherein no significant sulfur capture can be effected in the particulate separation equipment.

In one embodiment of the invention, unreacted sorbent can be separated from the flue gas stream, either before or after the low temperature sulfur capture reaction, preferably after such low temperature sulfur capture, and recycled and injected back into the flue gas stream at or upstream of the point of humidification. Such separation can be effected by typical particulate separation equipment or other known separation techniques. Thus, the present invention can be combined with a variety of known processes for injecting sorbent into the flue gas stream upstream of the low temperature sulfur capture region. Examples of such in-duct injection processes are as disclosed in U.S. Pat. No. 4,867,955, supra, U.S. Pat. No. 4,804,521 by Rochelle et al., issued Feb. 14, 1989; U.S. Pat. No. 4,931,264 by Rochelle et al., issued Jun. 5, 1990; U.S. Pat. No. 5,047,221 by Jozewicz et al., issued Sep. 10, 1991; and U.S. Pat. No. 5,047,222 by Rochelle et al., issued Sep. 10, 1991.

The present invention is particularly useful when a raw coal, prior to beneficiation for use in the fuel mixture, contains a high organic sulfur content and/or when a raw coal contains pyrite that is difficult to liberate. Although such raw coals are often subjected to aggressive beneficiation, it is generally not practical or possible to beneficiate such raw coals to a clean coal product that could be burned in the absence of sulfur sorbents to effectively control sulfur oxide emissions. Although some sulfur can be captured in a high temperature sulfur capture reaction as discussed in U.S. Pat. No. 4,824,441, supra, sulfur removal by a high temperature reaction alone is often not sufficient. Many of these difficult coals can be effectively used by combining aggressive coal beneficiation techniques, sulfur capture in a high temperature region, and sulfur capture in a lower temperature, high humidity region.

In one embodiment of the present invention, a raw coal, prior to beneficiation for use in the fuel mixture with sorbent, contains a high concentration of organic sulfur. A coal contains a high organic sulfur content when such raw coal contains above about 1.5 percent organic sulfur by weight on an ash-free basis.

In another embodiment of the present invention, a raw coal, prior to beneficiation for use in the fuel mixture with sorbent, and regardless of sulfur content, contains pyrite that liberates with difficulty. A coal contains pyrite that liberates with difficulty if, even when using aggressive beneficiation techniques, less than about 85 percent of the pyrite can be rejected while recovering about 85 percent of the BTU content in the clean coal product compared to the raw coal.

In one embodiment of the present invention, coal and sorbent are intimately mixed and formed into an agglomerated pellet form. As used herein, pellet includes all types of agglomerations, including pellets, briquettes and extrusions. Such agglomeration assures that the coal and sorbent will be intimately mixed during combustion, thereby maximizing sulfur capture in the high temperature region. Preferably, coal particles in the agglomeration are smaller than about 0.5 mm. Additional information covering such agglomerations is provided in application Ser. No. 07/775,860, supra.

The amount of sorbent added to the coal to form the fuel mixture depends on the sulfur content of the coal and the amount of sulfur reduction desired, and the acceptable level for ash-forming materials. However, in the case of calcium-containing sorbents, the sorbent is added in an amount preferably greater than about the stoichiometric amount of calcium required assuming complete reaction between calcium in the sorbent and sulfur in the coal, more preferably greater than two times the stoichiometric amount, and most preferably greater than about five times the stoichiometric amount.

The following example is provided for the purpose of illustrating the present invention and is not intended to limit the scope of the invention.

EXAMPLE

Figure 2:
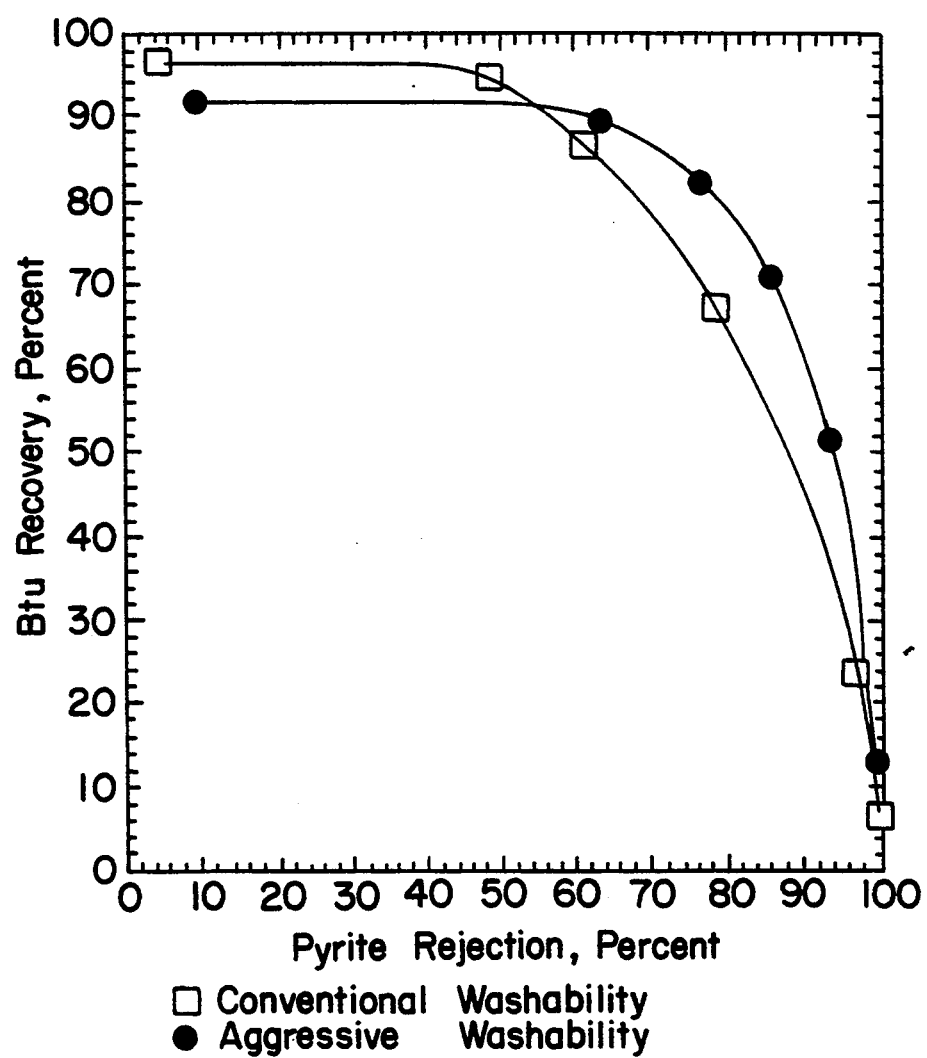
FIG. 2 is a graph showing pyrite rejection vs. BTU recovery from a Pittsburgh No. 8 Seam Coal using conventional and aggressive coal washing techniques.
Figure 3:
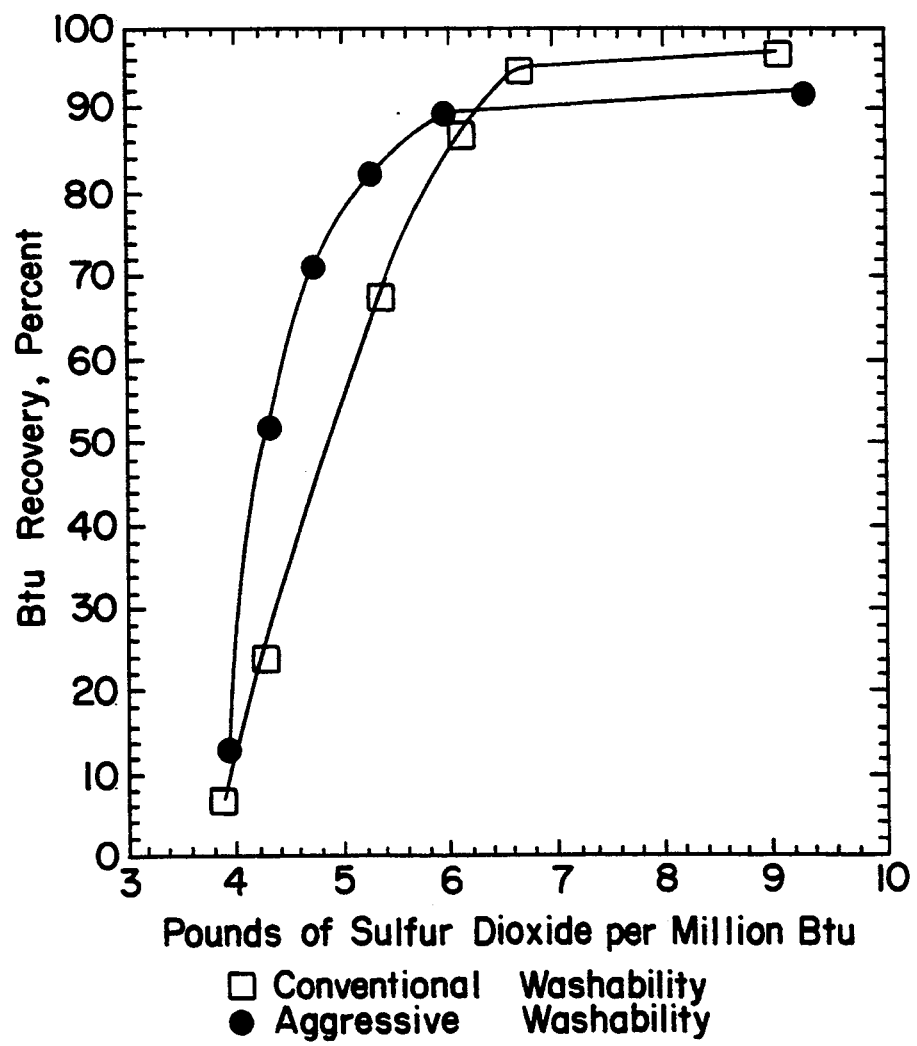
FIG. 3 is a graph showing sulfur content of clean coal product vs. BTU recovery for a Pittsburgh No. 8 Seam Coal using conventional and aggressive coal washing techniques.

This example demonstrates the application of the process of the present invention to reduce sulfur emissions for a coal containing a high concentration of organic sulfur and also containing pyrite that liberates poorly. The example also demonstrates the control of ash-forming materials in the coal and sorbent mixtures. The example uses a Pittsburgh No. 8 coal from eastern Ohio, which contains total sulfur equating to approximately 9.28 pounds of sulfur dioxide emissions per million BTU if combusted in the raw state. FIGS. 2 and 3 show the washability characteristics of this coal. FIG. 2 shows the rate of pyrite rejection as a function of BTU recovery in the clean coal relative to the raw coal. FIG. 3 shows the sulfur content of the clean coal as a function of BTU recovery both conventional beneficiation techniques and an aggressive beneficiation technique.

For example, the raw coal, also called run-of-mine coal, is subjected to aggressive beneficiation. The largest size coal fraction (1¼×⅛ mm) is sink-floated at specific gravities of 1.30 and 2.00. The 1.30 float is recovered as clean coal and the 2.00 sink is rejected. The middlings, 1.30 sink by 2.00 float, are then added to the minus ⅛ mm material from the raw coal. Ordinarily, aggressive beneficiation requires comminution of middlings, however such comminution is not required for this particular raw coal feed. The resulting mixture is then sink-floated at several different specific gravities. The resulting clean coal is then added to the 1.30 float for a composite clean coal product.

Through this aggressive coal beneficiation process, the 9.28 pounds of sulfur dioxide per million BTU for combusting raw coal is reduced to approximately 6.03 pounds of sulfur dioxide per million BTU in the beneficiated coal at a BTU recovery of approximately 86% in the beneficiated coal relative to the raw coal.

Limestone is then mixed with the ultra-fine particles of the beneficiated coal and the mixture is pelletized. As used in this example, ultra-fine coal particles refers to those coal particles from about 0.015 mm to about 0.105 mm in size. The pellets are then combined with the remaining coal particles. The amount of limestone added is 14.5% based on the total weight of the overall coal and sorbent mixture. The calcium-to-sulfur stoichiometry in the resulting product is 1.25.

An estimated 14% of the sulfur in this fuel mixture is captured in the boiler through sulfation of the sorbent in the high temperature sulfur capture region. The emission level from the boiler is therefore approximately 5.20 pounds of sulfur dioxide per million BTU.

The flue gas existing the boiler contains unreacted sulfur dioxide and entrained ash, including unreacted calcium in the form of lime. The molar ratio of unreacted calcium to sulfur dioxide exiting the boiler is approximately 1.3. Water is then added to the flue gas to adjust the temperature to just above the condensation temperature to effect additional sulfur capture. Following this low temperature sulfur capture, sulfur dioxide emissions are reduced to 1.2 pounds per million BTU, in compliance with the year 2000 standard of the United States Clean Air Act Amendments of 1990. Results of the example are summarized in Table I.

Table I shows the stepwise reduction in sulfur emissions. Table I also shows that, by using aggressively beneficiated coal, sorbent can be added to the coal without causing excessive ash production, thus allowing the addition of more sorbent than if the coal were not aggressively beneficiated.

TABLE I

|  | Ash-Forming mtl., % by weight | Lbs. SO$_2$ per million BTU |
| --- | --- | --- |
| Raw Coal | 26.9 | 9.28 |
| Beneficiated Coal | 7.6 | 6.03 |
| Coal/Sorbent Fuel Mixture | 16.0 | 6.03 |
| After High Temperature Sulfur Capture | n/a | 5.20 |
| After Low Temperature Sulfur Capture | n/a | 1.20 |

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

I claim:
1. A process for reducing the emission of sulfur oxides from the combustion of coal, comprising:
 (a) combusting a fuel mixture of sulfur-containing coal and calcium-containing sulfur sorbent, said coal comprising coal particles resulting from aggressively beneficiating raw coal, wherein said aggressive beneficiation comprises (i) separating the raw coal into a coarse size fraction and a fine size fraction (ii) density separating the coarse fraction into a clean coal fraction, a refuse fraction and a middling fraction, (iii) comminuting said middling fraction, and (iv) combining said comminuted middling fraction with said fine fraction and further beneficiating the combined fraction, said calci- um-containing sulfur sorbent comprising a calcium-containing compound selected from the group consisting of lime, limestone, hydrated lime, calcium oxide, dolomite, burnt dolomite, hydrated dolomite and combinations thereof, at least a portion of calcium in said sulfur sorbent reacts with sulfur oxides emitted during the combustion of coal, said combusting producing a flue gas comprising sulfur and calcium derived from said sulfur sorbent;

(b) following said combusting, allowing a first portion of said calcium in the flue gas to react with a first portion of said sulfur in the flue gas in a first stage of sulfur capture in a high temperature region following combustion;

(c) following said reaction of said first portion of said calcium in the flue gas, cooling said flue gas to a temperature within about 100° F. above the condensation temperature using heat exchange or adding water to the flue gas said condensation temperature is the temperature at which aqueous liquid condenses from said flue gas; and (d) following said cooling, allowing a second portion of said calcium in the flue gas to react with a second mortion of said sulfur in the flue gas at a temperature within about 100° F. above the condensation temperature of the flue gas stream in a second stage of sulfur capture prior to particulate separation from said flue gas, said second stage of sulfur capture having a residence time of greater than about 0.1 second.

2. The process of claim 1, wherein said second stage of sulfur capture comprises reacting said second portion of calcium with said second portion of sulfur in the flue gas at a temperature within 50° F. above the condensation temperature at the flue gas stream.

3. The process of claim 1, wherein said second stage of sulfur capture comprises reacting said second portion of calcium with said second portion of sulfur in the flue gas at a temperature within 30° F. above the condensation temperature at the flue gas stream.

4. The process of claim 1, wherein said second stage of sulfur capture comprises reacting said second portion of calcium with said second portion of sulfur in the flue gas at a temperature within 15° F. above the condensation temperature of the flue gas stream.

5. The process of claim 1, wherein said second stage of sulfur capture further comprises a residence time of greater than 1 second.

6. The process of claim 1, wherein said second stage of sulfur capture further comprises a residence time of greater than 3 seconds.

7. The process of claim 1, further comprising separating particulates from the flue gas stream after said second stage of sulfur capture by electrostatic precipitation.

8. The process of claim 1, wherein said raw coal comprises pyrite that is difficult to separate in that aggressive beneficiation of said raw coal would result in rejecting less than 85% of the pyrite in the raw coal while recovering about 85% of the BTU value in the aggressively beneficiated coal relative to the raw coal.

9. The process of claim 3, wherein said raw coal comprises organic sulfur in an amount greater than about 1.5% by weight on an ash-free basis.

10. The process of claim 1, wherein said sulfur sorbent comprises a pelletized intimate mixture of ultrafine coal particles and limestone.

11. The process of claim 10, wherein said pelletized mixture comprises coal particles of a size from about 0.015 mm to about 0.105 mm.

12. The process of claim 1, further comprising releasing sulfur dioxide emissions to the atmosphere in an amount below about 1.2 pounds per million BTU of coal in the fuel mixture.

13. The process of claim 1, wherein said mixture of coal and sulfur sorbent comprises ash-forming materials in an amount less than about 20% by weight.

14. The process of claim 1, wherein said mixture of coal and sulfur sorbent comprises ash-forming materials in an amount less than about 15% by weight.

15. The process of claim 1, wherein said mixture of coal and sulfur sorbent comprises ash-forming materials in an amount less than about 12% by weight.

16. The process of claim 1, wherein said cooling is an air preheater heat exchange after said first stage of sulfur capture and before said second stage of sulfur capture.

17. The process of claim 1, wherein said calcium-containing sorbent is selected from the group consisting of limestone, lime, dolomite, and combinations thereof.

18. The process of claim 1, further comprising separating particulates, including unreacted sulfur sorbent, from said flue gas after said second stage of sulfur capture and injecting at least a portion of said separated particulates into the flue gas before said second stage of sulfur capture.

19. The process of claim 1, wherein said first stage of sulfur capture further comprises reacting said first portion of sulfur sorbent with said first portion of sulfur in the flue gas at a temperature above 1500° F.

* * * * *